No. 646,745. Patented Apr. 3, 1900.
A. A. LOW.
CLUTCH FOR PROPELLER SHAFTS.
(Application filed Nov. 7, 1899.)

(No Model.) 2 Sheets—Sheet 1.

Witnesses:
Inventor:
Abbot Augustus Low
By his Attorney
George William Miatt

THE NORRIS PETERS CO., PHOTO-LITHO., WASHINGTON, D. C.

No. 646,745.  
A. A. LOW.  
CLUTCH FOR PROPELLER SHAFTS.  
(Application filed Nov. 7, 1899.)  
Patented Apr. 3, 1900.
(No Model.) 2 Sheets—Sheet 2.
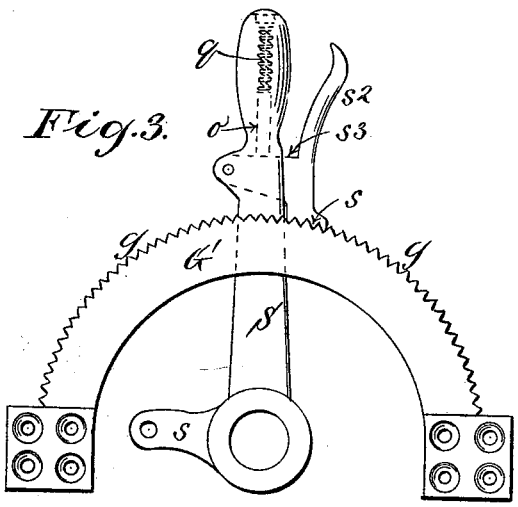
Fig. 3.
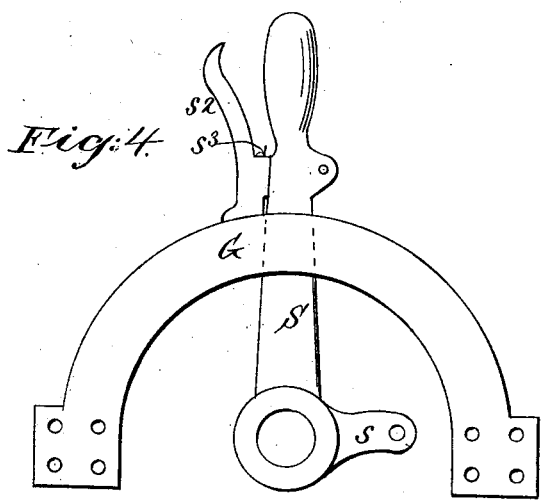
Fig. 4.
Fig. 5.
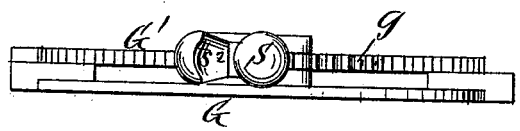
Witnesses:
Inventor:  
Abbot Augustus Low  
By his Attorney  
George William Miatt

UNITED STATES PATENT OFFICE.

ABBOT AUGUSTUS LOW, OF NEW YORK, N. Y.

CLUTCH FOR PROPELLER-SHAFTS.

SPECIFICATION forming part of Letters Patent No. 646,745, dated April 3, 1900.

Application filed November 7, 1899. Serial No. 736,088. (No model.)

*To all whom it may concern:*

Be it known that I, ABBOT AUGUSTUS LOW, a citizen of the United States, residing in the city of New York, borough of Brooklyn, in the county of Kings and State of New York, have invented certain new and useful Improvements in Devices for Controlling Marine Propellers, of which the following is a specification sufficient to enable others skilled in the art to which the invention appertains to make and use the same.

My invention relates to mechanism for connecting or disconnecting marine propellers with relation to the motor employed for the propulsion of a boat, and is designed to render such means effective and positive in operation, and thereby guard against accident or delay.

The invention consists in the combination and arrangement, with the propeller-shaft and with the motor-shaft, of a clutch or coupling device controlled by a segmental rack and lever of special construction, as hereinafter more fully described and claimed.

Figure 1:
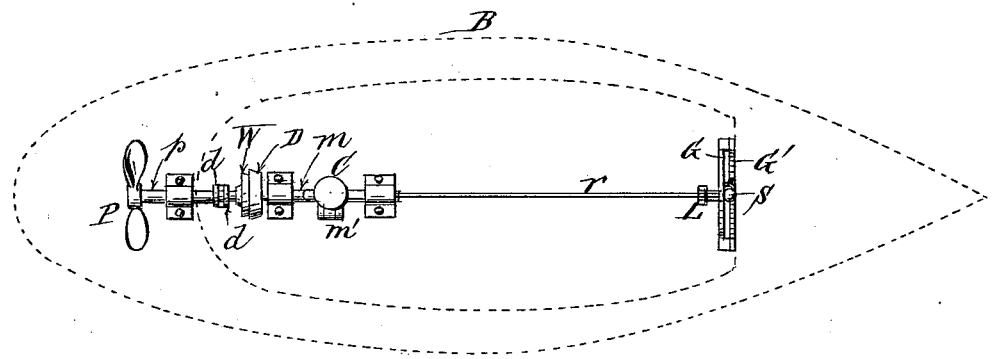
Figure 2:
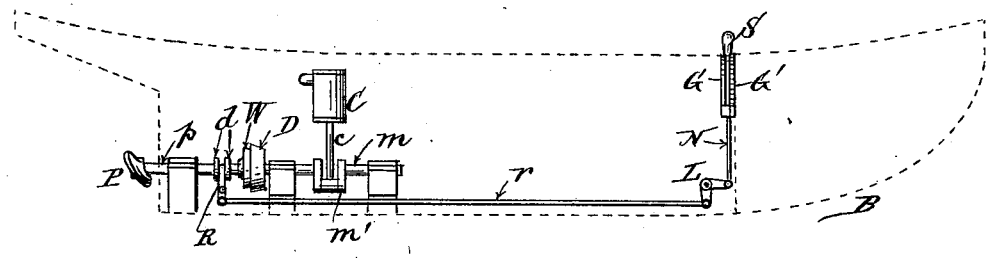

In the accompanying drawings, Figure 1 is a diagrammatic representation of the plan of a boat equipped with my improved screw controlling mechanism; Fig. 2, an elevation of the same, also diagrammatic. Figs. 3 and 4 are respectively elevations of opposite sides of my segmental rack and lever detached; Fig. 5, a top view of the same.

In Figs. 1 and 2, which are necessarily symbolical, the outline of the boat B is indicated by dotted lines. P is the propeller, and $p$ its shaft, mounted in such manner that it may be moved longitudinally within certain limits. On the inner end of the propeller-shaft $p$ is mounted a conical clutch-wedge W or equivalent. The motor-shaft $m$ is in line with the longitudinal axis of the propeller-shaft $p$, its opposed end being provided with the cup-shaped disk D, which rotates with the said power-shaft $m$.

It is obvious that instead of the clutch mechanism shown herein by way of illustration any suitable or well-known mechanical expedient may be substituted without departing from the spirit and intent of my invention, the essential feature in this respect being the interposition between the propeller and the power shafts of means of coupling or uncoupling said shafts, said means being controlled and operated from the bow of the boat by my special form of actuating-lever and connections. Furthermore, the form of motor employed to rotate the power-shaft $m$ is not material to the invention, the cylinder C and pitmen $c$, connecting with the crank $m'$ of the motor-shaft $m$, being used figuratively to represent a suitable source of power and motion.

Secured rigidly to the propeller-shaft $p$ are annular shoulders $d\ d$, with which the upper ends of a bifurcated rock-lever R engage. The lower end of this rock-lever R is connected by a rod $r$ with a bell-crank lever L, interposed between said rod $r$ and the vertical link N, the upper end of which is pivotally connected to the short arm $s$ of the hand-lever S. The hand-lever S travels between two segmental guides G G', one of which, G', is formed peripherally with a series of rack-teeth $g\ g$ for engagement with corresponding teeth $s'$ on the ratchet lever or dog $s^2$, which tends constantly to positively engage with the segment G' by reason of the spring $q$ acting through the plunger $o$ upon the lateral and pivotal arm $s^3$ of the said dog-lever $s^2$. The segmental guides G G' are fastened to the superstructure of the bow, the hand-lever S being pivotally supported thereon also.

By way of illustration the operation may be stated as follows: The dog-lever $s^2$ being raised against the action of the spring $q$ to release the teeth $s'$ from the rack-teeth $g$, the hand-lever S is thrown over in one direction or the other to throw the clutch-plug W into or out of engagement with the cup-disk D to connect or disconnect the two shafts $p$ and $m$, as may be desired, the dog-lever $s^2$ being then released to engage with the segmental rack G' and lock the parts positively in position for the time being. By this means slip or accidental displacement is positively prevented, the hand of the operator being released from the duty of holding the parts in a prescribed position and being free to handle the steering-gear or perform other duties. At the same time the propeller is under instant and perfect control, the act of grasping the handle of the lever S being sufficient to release the dog-lever $s^2$ from the segmental rack G'.

It is obvious that instead of having the propeller-shaft $p$ move longitudinally to engage the motor-shaft $m$ the part of the clutch device on said propeller-shaft may be feathered or otherwise connected so as to slide thereon.

What I claim as my invention, and desire to secure by Letters Patent, is—

In a device for controlling marine propellers, the combination of the motor C, the pitmen $c$, the crank $m'$, the motor-shaft $m$, the cup-shaped disk D, on said motor-shaft, the propeller P, propeller-shaft $p$, movable longitudinally in its bearings, the shoulders $d$, $d$, and the clutch-wedge W, upon said movable propeller-shaft, the rock-lever R, the rod $r$, the bell-crank lever L, the vertical link N, the hand-lever S, the ratchet-lever $s^2$, and spring $q$, and the segmental guides G, G', the latter formed peripherally with the series of rack-teeth $g$, $g$, the whole arranged and operating substantially in the manner and for the purpose described.

ABBOT AUGUSTUS LOW.

Witnesses:
D. W. GARDNER,
GEO. WM. MIATT.